(12) United States Patent
Chen et al.

(10) Patent No.: US 11,047,788 B2
(45) Date of Patent: Jun. 29, 2021

(54) PARTICULATE MATTER SENSING DEVICE

(71) Applicant: INDUSTRIAL TECHNOLOGY RESEARCH INSTITUTE, Hsinchu (TW)

(72) Inventors: Tzu-Ming Chen, Hsinchu (TW); Jung-Nan Hsu, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 34 days.

(21) Appl. No.: 16/388,411

(22) Filed: Apr. 18, 2019

(65) Prior Publication Data

US 2020/0200666 A1 Jun. 25, 2020

(30) Foreign Application Priority Data

Dec. 19, 2018 (TW) ................................. 107146000

(51) Int. Cl.
*G01N 15/06* (2006.01)
(52) U.S. Cl.
CPC ................................ *G01N 15/0656* (2013.01)
(58) Field of Classification Search
CPC .................................................. G01N 15/0656
See application file for complete search history.

(56) References Cited

U.S. PATENT DOCUMENTS

| | | | |
|---|---|---|---|
| 4,531,402 A | 7/1985 | Reif et al. | |
| 7,549,317 B2 | 6/2009 | Rhodes et al. | |
| 7,562,414 B2 * | 7/2009 | Oh | A47L 9/19 15/319 |
| 8,607,616 B2 | 12/2013 | Marra | |
| 9,573,544 B1 * | 2/2017 | Ghannam | G01L 19/0636 |
| 10,537,901 B2 * | 1/2020 | Lee | F24F 1/0076 |
| 2004/0089156 A1 * | 5/2004 | Gartstein | B03C 3/16 96/53 |

(Continued)

FOREIGN PATENT DOCUMENTS

| | | |
|---|---|---|
| CN | 103926178 A | 7/2014 |
| CN | 205844139 U | 12/2016 |

(Continued)

OTHER PUBLICATIONS

PPD42NJ Particle Sensor Unit, Shinyei Technology, http://www.shinyei.co.jp/stc/eng/optical/main_ppd42.html, 2016, 2 pages.

(Continued)

*Primary Examiner* — Akm Zakaria
(74) *Attorney, Agent, or Firm* — Muncy, Geissler, Olds & Lowe, P.C.

(57) ABSTRACT

A particulate matter sensing device includes a screening component, a charging component, and a collecting and sensing component. The screening component separates a plurality of particulate matters from the air by inertial impaction. The charging component is used to produce a plurality of ions to combine with the particulate matters separated by the screening component, making each of the particulate matters separated by the screening component having a first electricity. The collecting and sensing component includes a collecting unit and a sensing unit electrically connected to the collecting unit, to detect the amount of charges of the particulate matters that reach the collecting unit.

22 Claims, 5 Drawing Sheets

(56) References Cited

U.S. PATENT DOCUMENTS

| | | | |
|---|---|---|---|
| 2005/0050968 A1 | 3/2005 | Trenholm | |
| 2005/0126260 A1 | 6/2005 | Totoki | |
| 2007/0056395 A1* | 3/2007 | Bae | G01N 15/0656 73/865.5 |
| 2007/0125688 A1* | 6/2007 | Ballman | B07B 1/46 209/405 |
| 2008/0297798 A1* | 12/2008 | Wyssen | G01N 21/94 356/338 |
| 2011/0216317 A1* | 9/2011 | Marra | B03C 3/017 356/335 |
| 2013/0206649 A1* | 8/2013 | Sorhuus | B07B 1/04 209/250 |

FOREIGN PATENT DOCUMENTS

| | | |
|---|---|---|
| CN | 104502243 B | 1/2017 |
| CN | 107921443 A | 4/2018 |
| CN | 108072594 A | 5/2018 |
| TW | I503530 B | 10/2015 |
| TW | M520140 U | 4/2016 |
| TW | 201621294 A | 6/2016 |
| TW | 201629458 A | 8/2016 |
| TW | I571819 B | 2/2017 |
| TW | I596328 B | 8/2017 |

OTHER PUBLICATIONS

Samyoung S&C Co., Ltd., DSM501 Dust Sensor Module, Sungnam-city, Kyoungki-do, Korea, 2010, 11 pages.

DustDuino Data Quality, Public Lab Research Note, Mar. 6, 2001, Public Lab, http://publiclab.org/n/11659, 3 pages.

Austin et al., Laboratory Evaluation of the Shinyei PPD42NS Low-Cost Particulate Matter Sensor, PLOS One 10(9): e0137789, Sep. 14, 2015, 17 pages.

Dong et al., Silicon microfabrication based particulate matter sensor, Sensors and Actuators A: Physical, 2016, pp. 115-124, Elsevier, 10 pages.

John G. Watson, Visibility: Science and Regulation, Journal of the Air & Waste Management Association, vol. 52, Jul. 2002, pp. 628-713, Air & Waste Management Association, 87 pages.

* cited by examiner

PARTICULATE MATTER SENSING DEVICE

This application claims the benefit of Taiwan application Ser. No. 107146000, filed Dec. 19, 2018, the disclosure of which is incorporated by reference herein in its entirety.

TECHNICAL FIELD

The disclosure relates in general to a particulate matter sensing device, and more particularly to a non-optical particulate matter sensing device.

BACKGROUND

Particulate matter is one of the most common air pollutants. $PM_{2.5}$ in the fine particulate matter refers to suspended particulates having a particle diameter of less than or equal to 2.5 µm. When the concentration of fine particulate matter (for example, $PM_{2.5}$) increases, it may affect the health of residents and may even increase the risk of death. Therefore, sensing of the particulate matter is a key issue today.

At present, the particulate sensing device installed in the air quality monitoring station of government mainly uses a large-scale instrument. Although it has a precise measuring method, it is expensive and has low portability, and cannot be widely used by the public. In order to make it easier for people to use the particulate matter sensing device, it is necessary to design a small-sized particulate matter sensing device. The particulate matter sensing device commonly used in the market belongs to the optical particulate matter sensing device. However, the optical particulate matter sensing device has many factors affecting sensing, such as shadowing effect, light source pollution, particle refractive index, scattering angle, shape of particulate matter, surface characteristics of particulate matter, uneven concentration distribution of particulate matter, etc., which in turn leads to inaccurate sensing of particulate matter.

Therefore, there is still a need to develop a particulate matter sensing device capable of improving the accuracy of sensing.

SUMMARY

The disclosure is directed to a particulate matter sensing device. Since the particulate matter sensing device of the present invention collects particulate matters and detects the amount of particulate matters under the action of an impact and an electrostatic field, in addition to improving the accuracy of particulate matter sensing device, smaller sized particles can be measured in comparison with conventional optical particulate matter sensing device.

According to one aspect of present invention, a particulate matter sensing device is provided. The particulate matter sensing device includes a screening component, a charging component, a collecting and sensing component and an air extracting unit drawing the external air inside the screening component. The screening component screens a plurality of particulates matter from the air by inertial impact. The charging component is used to produce a plurality of ions to combine with the particulates matter separated by the screening component, making each of the particulate matters separated by the screening component having a first electricity. The collecting and sensing component includes a collecting unit and a sensing unit electrically connected to the collecting unit, to detect the amount of charges of the particulate matters that reach the collecting unit. Finally, the measured particulate matters are discharged from the particulate matter sensing device by the air extracting unit.

According to another aspect of present invention, a particulate matter sensing device is provided. The particulate matter sensing device includes a screening component, a charging component, a collecting and sensing component and an air extracting unit drawing the external air inside the screening component. The screening component screens a plurality of particulate matters from the air by inertial impact. The charging component is used to produce a plurality of ions to combine with the particulate matters separated by the screening component, making each of the particulate matters separated by the screening component having a first electricity. The collecting and sensing component includes a collecting unit and a sensing unit electrically connected to the collecting unit, to detect the amount of charges of the particulate matters that reach the collecting unit. Wherein, the collecting unit includes a horizontal collecting unit. Finally, the measured particulate matters are discharged from the particulate matter sensing device by the air extracting unit.

According to an alternative aspect of present invention, a particulate matter sensing device is provided. The particulate matter sensing device includes a screening component, a charging component, a collecting and sensing component and an air extracting unit drawing the external air inside the screening component. The screening component screens a plurality of particulate matters from the air by inertial impact. The charging component is used to produce a plurality of ions to combine with the particulate matters separated by the screening component, making those particulates possess a first electricity. The collecting and sensing component includes a collecting unit and a sensing unit electrically connected to the collecting unit, to detect the amount of charges of the particulate matters that reach the collecting unit. Wherein, the collecting unit includes a vertical collecting unit and a horizontal collecting unit. Finally, the measured particulate matters are discharged from the particulate matter sensing device by the air extracting unit.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION

Figure 1:
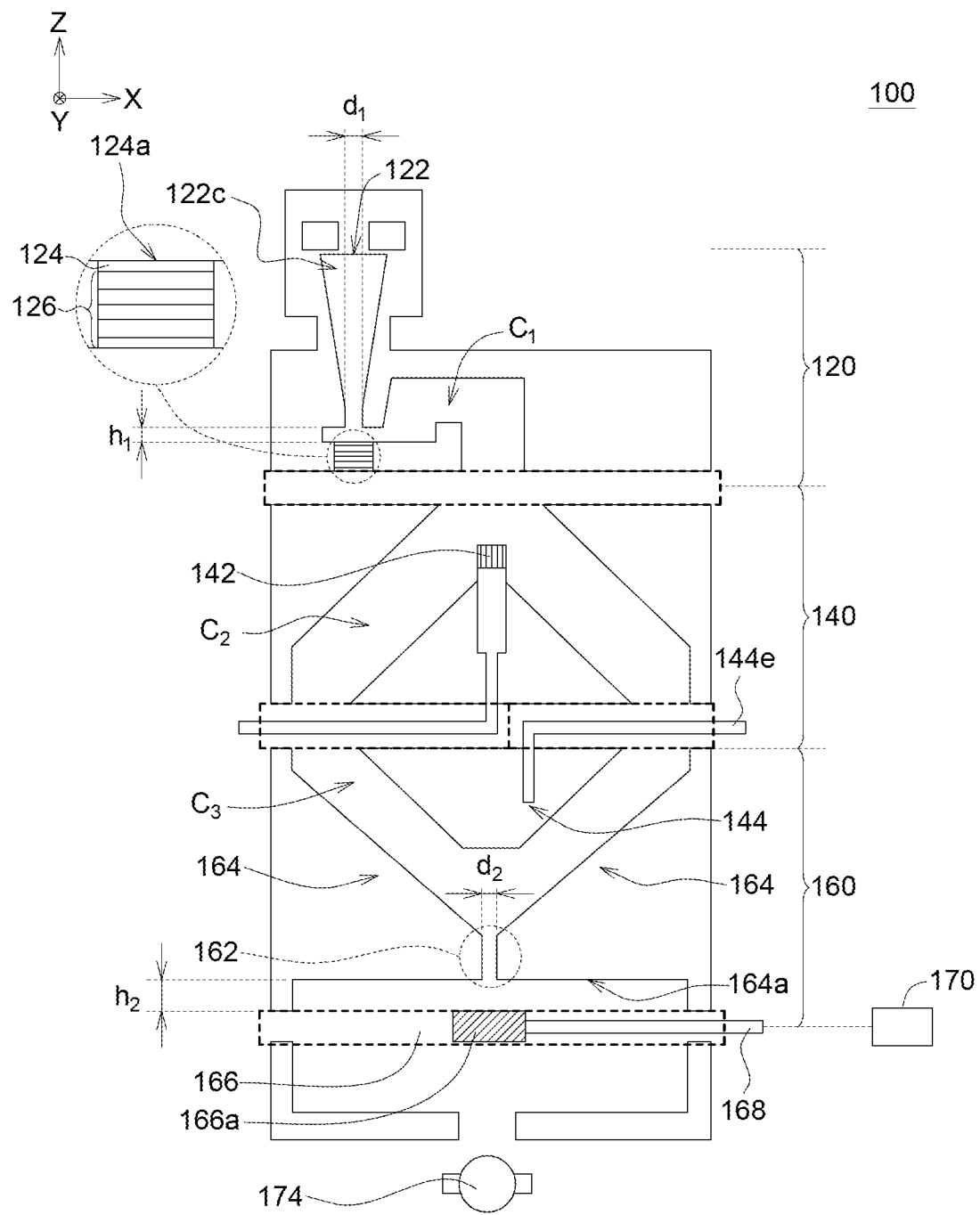
FIG. 1 is a cross-sectional view of a particulate matter sensing device in accordance with an embodiment of the present invention.

Hereinafter, embodiments of the present invention will be described in detail with reference to the accompanying drawings. The same reference numerals are used to designate the same or similar parts. It is to be noted that the drawings have been simplified to clearly illustrate the contents of the embodiments, and the dimensional ratios in the drawings are not drawn to the scale of the actual products, and thus are not intended to limit the scope of the present invention. Further, the detailed components of the embodiments are for illustrative purposes, and are not intended to limit the scope of the disclosure. Those having ordinary knowledge may modify or change the components as needed in accordance with the actual implementation.

FIG. 1 is a cross-sectional view of a particulate matter sensing device 100 in accordance with an embodiment of the present invention.

Referring to FIG. 1, the particulate matter sensing device 100 includes a screening component 120, a charging component 140, a collecting and sensing component 160, and an air extracting unit 174. The charging component 140 is located between the screening component 120 and the collection and sensing component 160. The air extracting unit 174 is located below the collecting and sensing component 160 for drawing air into the particulate matter sensing device 100, and continuously transmitting the airflow in the particulate matter sensing device 100, and finally guiding the air inside the particulate matter sensing device 100 to the outside. In the present embodiment, the air extracting unit 174 is a pump, but the invention is not limited thereto, and the air extracting unit 174 can also be any suitable air extracting element.

Air may enter through the inlet 122 of the particulate matter sensing device 100 and the particles of a predetermined size in the air are separated by the screening component 120. The screening component 120 includes an impaction panel 124 and an adjustment element 126. The distance between the impaction panel 124 and the inlet 122 can be changed by the adjustment element 126. The screening of size of the particle diameter of the particulate is related to the ratio of the diameter $d_1$ of inlet 122 and the distance $h_1$ from the impaction panel 124 to the inlet 122. The diameter $d_1$ of the inlet 122 is smaller than the width of the impaction panel 124. For example, if the particle diameter of the particulate matter to be separated is expected to be equal to or smaller than 2.5 μm, the $d_1/h_1$ is set and adjusted to 0.6 to 1.0, and particulate matters having a particle diameter larger than 2.5 μm can be excluded by the screening, to introduce particulate matters having a particle diameter equal to or smaller than 2.5 μm into the subsequent system. The screening component 120 can adjust the distance between the impaction panel 124 and the inlet 122 according to the predetermined size and amount of airflow depending on the requirements. The present invention collects particulate matters and detects the concentration of the particulate matters having the particle diameter equal to or smaller than 2.5 μm, and the diameter $d_1$ of the inlet 122 is 1 to 5 mm. The distance $h_1$ of the impaction panel 124 to the inlet 122 is 1 to 5 mm. The air can pass the channel structure 122c after entering the inlet 122, and particulate matters larger than a predetermined size in the air can be impacted onto the impaction panel 124 by inertial impact, and oil is applied on the upper surface 124a of the impaction panel 124 to adhere the particulate matters. The particulate matters set to be equal to or smaller than the predetermined size are particulate matters of a predetermined size, and the particulate matters larger than the predetermined size have a larger inertia, so that particulate matters larger than a predetermined size can adhere to the impaction panel 124, and particulate matters equal to or smaller than the predetermined size follow the air flow moving to the first channel $C_1$. In one embodiment, the radius of the inlet 122 is a fixed value, and the distance between the impaction panel 124 and the inlet 122 can be varied by the adjustment element 126. In an embodiment, the impaction panel 124 and the adjustment element 126 have means for adjusting the height to each other such that the impaction panel 124 can be moved up and down, for example, in the direction in which the Z axis extends. The impaction panel 124 is a structure that is easy to remove and is easy to clean.

Next, the particulate matters in the first channel $C_1$ move to the region where the charging component 140 is located. The charging component 140 includes a discharge electrode 142 and an ion captor 144. The discharge electrode 142 applies a high voltage to the air molecules to produce a plurality of ions having a first electricity. The ions with the first electricity can be combined with the particulate matters separated by the screening component 124 making those particulate matters possess a first electricity. The first electricity can be positive or negative. Since the charging component 140 can generate a high concentration of air ions by the discharging electrode 142, the charging efficiency of the particulate matters can be increased, thereby improving the collection efficiency of the particulate matters and increasing the accuracy of the sensing. For example, the discharge electrode 142 may be a tip electrode, an electrode line, or a carbon brush electrode. After the air ions and the charged particulate matters move to the second channel $C_2$, they enter the third channel $C_3$ and move to the region of the ion captor 144, which is in communication with the third channel $C_3$. In one embodiment, the ion captor 144 is located below the discharge electrode 142. The ion captor 144 is a conical, cylindrical, or rod-shaped metal. The ion captor 144 has a second electricity generated by the electrode 144e. The second electricity is opposite to the first electricity. The voltage applied to the ion captor 144 by the electrode 144e is smaller than the voltage generated by the discharge electrode 142. Since the ion captor 144 has a second electricity, it can be used to capture free ions that are not combined to the particulate matters among the ions generated by the discharge electrode 142.

Thereafter, the charged particulate matters in the third channel $C_3$ enter the region of the collecting and sensing component 160. The collecting and sensing component 160 includes an acceleration channel 162, an electric field generating unit 164, a collecting unit 166, and a sensing unit 168. The acceleration channel 162 is in communication with the third channel $C_3$. The charged particulate matters in the third channel $C_3$ pass through the acceleration channel 162 and are collected on the collecting unit 166 by inertial impact. For example, the acceleration channel 162 can be a nozzle structure. The collecting unit 166 is, for example, a plate-like structure including a collecting plate 166a. In the present embodiment, the collecting unit 166 is a horizontal collecting unit. For example, the extending direction of the collecting unit 166 (for example, extending along the X-axis direction) is perpendicular to the extending direction of the acceleration channel (for example, extending along the Z direction). In an embodiment, the diameter $d_2$ of the acceleration channel 162 may be between 0.5 and 2 mm, and the distance $h_2$ between the acceleration channel 162 and the collecting unit 166 may be between 0.5 and 2 mm. The diameter $d_2$ of the acceleration channel 162 is smaller than the width of the collecting plate 166a. The electric field generating unit 164 is a metal body and is applied with the same electricity as the discharge electrode 142 to generate an electrostatic field having a first electricity. The repulsive force from the same electricity can prevent the particulate matters with the first electricity from stagnating on the electric field generating unit 164, and the particulate matters with the first electricity are sent to the acceleration channel 162 in conjunction with the inertial force. In addition, the electric field generating unit 164 can bring the particulate matters which have not collected by the collecting unit 166 after being accelerated through the accelerating channel 162 immediately to be close to the collecting unit 166, that is, the electric field generating unit 164 can press the charged particulate matters between the lower surface 164a thereof and the collecting unit 166 down on the collecting plate 166a to increase the collection efficiency of the particulate matters. The majority of the particle diameter of the particulate matters collected on the collecting unit 166 can range from 0.25 micro meters to 2.5 micro meters. The collecting unit 166 selects the particulate matters having the first electricity. The selected particulate matters and other particles that are not collected by the collecting unit 166 are discharged from the particulate matters sensing device 100 via the air extracting unit 174 along with the air flow. In one embodiment, the acceleration channel 162 and the collecting unit 166 are both electrically conductive materials, such as metal materials. The sensing unit 168 can be electrically connected to the collecting unit 166 to detect the amount of charge carried by the particulate matters reaching the collecting unit 166. The more the measured amount of the charge, the more the number of the particulate matters is. The sensing unit 168 can include an ammeter, an electrometer, a voltmeter, or a circuit. The ammeter or the electrometer can be electrically connected to the collecting unit 166 by a current sensing probe to detect the current carried by the particulate matters reaching on the collecting unit 166. The voltmeter can be electrically connected to the collecting unit 166 by a voltage sensing probe to detect the voltage of the particulate matters reaching the collecting unit 166. In some embodiments, the sensing unit 168 in the sensing component 160 can be electrically connected to a data analysis circuit 170 for data processing.

Since the collecting and sensing component 160 of the present invention includes an acceleration channel 162, an electric field generating unit 164, and a collecting unit 166, charged particles can be collected on the collecting unit 166 by inertial impact and electrostatic field action, and thus in comparison with the comparative example of the general optical particulate matter sensing device, the particle collecting efficiency can be increased, and the lower limit of the detected particle diameter can be reduced, thereby improving the accuracy of the sensing to the particulate matters.

Figure 2:
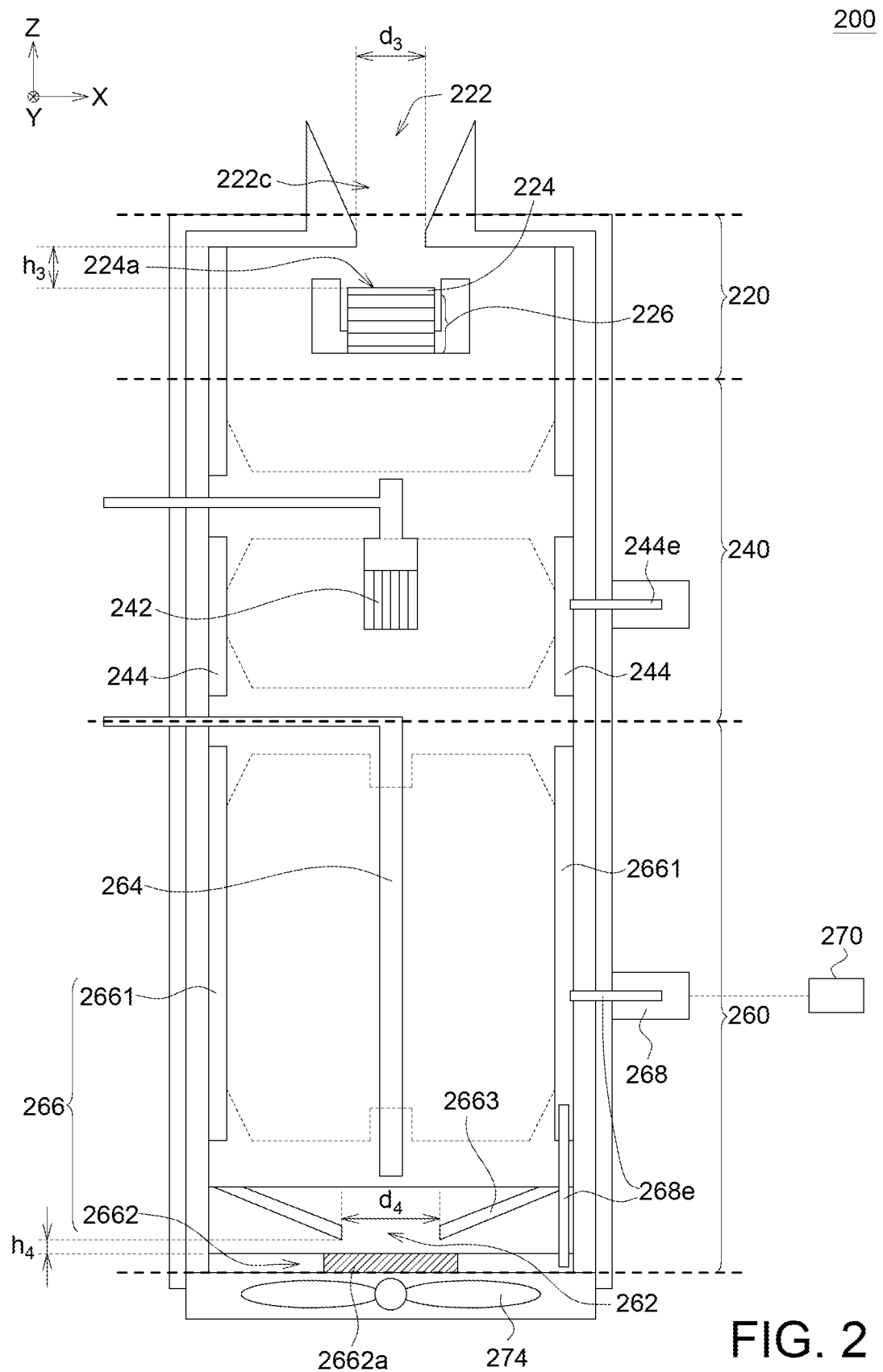
FIG. 2 is a cross-sectional view of a particulate matter sensing device in accordance with a further embodiment of the present invention.

FIG. 2 is a cross-sectional view of a particulate matter sensing device 200 in accordance with yet another embodiment of the present invention.

Referring to FIG. 2, the particulate matter sensing device 200 includes a screening component 220, a charging component 240, a collecting and sensing component 260, and an air extracting unit 274. The charging component 240 is located between the screening component 220 and the collecting and sensing component 260. The air extracting unit 274 is located below the sensing component 260 for drawing air into the particulate matter sensing device 200 and continuously transmitting the airflow in the particulate matter sensing device 200 downwardly, and finally exporting the air in the particulate matter sensing device 200 to the outside. In the present embodiment, the air extracting unit 274 is a fan, but the invention is not limited thereto, and the air extracting unit 274 can also be any suitable air extracting element.

Air may enter from the inlet 222 of the particulate matter sensing device 200 and screen for particles having a predetermined size in the air by the screening component 220. The screening component 220 includes an impaction panel 224 and an adjustment component 226. The distance between the impaction panel 224 and the inlet 222 can be changed by the adjustment element 226. The screening of the particle diameter of the particulate matter is related to the ratio of the diameter $d_3$ of the inlet 222 and the distance $h_3$ from the impaction panel 224 to the inlet 222. The inlet 222 has a diameter $d_3$ that is less than the width of the impaction panel 224. For example, if the particle size of the particulate matters to be separated is expected to be equal to or smaller than 2.5 μm, the $d_3/h_3$ is set and adjusted to 0.6 to 1.0, and particles having a particle diameter larger than 2.5 μm can be excluded to introduce particulates matters with a particle size equal to or smaller than 2.5 μm into the subsequent system. The distance between the impaction panel 224 and the inlet 222 can be adjusted according to the predetermined size and amount of gas flow to be collected depending on requirements. The present invention collects particulate matters and detects the concentration of the particulate matter having the particle diameter equal to or smaller than 2.5 μm. The inlet 222 has a diameter $d_3$ from 1 to 5 mm. The distance $h_3$ of the impaction panel 224 to the inlet 222 is 1 to 5 mm. After the air enters the inlet 222, it can pass through the channel structure 222c. The particles in the air can be impacted onto the impaction panel 224 by inertial impact, and oil is applied on the upper surface 224a of the impaction panel 224 to adhere the particles. The particulate matters set to be equal to or smaller than the predetermined size are particulate matters of a predetermined size, and the particles larger than the predetermined size have a larger inertia, so that particles larger than a predetermined size adhere to the impaction panel 224, and particulate matters equal to or smaller than the predetermined size follow with the air flow moving toward the channel on the side of the screening component 220. In an embodiment, since the adjusting element 226 can change the distance between the impaction panel 224 and the inlet 222, in one embodiment, the impaction panel 224 and the adjustment element 226 have means for adjusting the height to each other such that the impaction panel 224 can be moved up and down, for example, in the direction in which the Z axis extends. The impaction panel 224 is a structure that is easy to remove and is easy to clean.

Next, the particulate matters having a particle size equal to or smaller than the predetermined particle diameter move to the region where the charging component 240 is located. The charging component 240 includes a discharge electrode 242 and an ion captor 244. The discharge electrode 242 applies a high voltage to the air molecules to produce a plurality of ions having a first electricity. The ions with the first electricity can be combined with the particulate matters separated by the screening component 220 such that the particulate matters separated by the screening component 220 have the first electricity, respectively. The first electricity can be positive or negative. Since the charging component 240 can generate a high concentration of air ions by the discharge electrode 242, the charging efficiency of the particulate matters can be increased, thereby improving the collection efficiency of the particulate matters and increasing the accuracy of the sensing. For example, the discharge electrode 242 may be a tip electrode, an electrode line, or a carbon brush electrode. In one embodiment, the ion captor 244 surrounds the discharge electrode 242. The ion captor 244 has a second electricity generated by the electrode 244e. The second electricity is opposite to the first electricity. The voltage applied to the ion captor 244 by the electrode 244e is smaller than the voltage generated by the discharge electrode 242. Since the ion captor 244 has the second electricity, it can be used to capture free ions that are not combined to the particulate matters among the ions generated by the discharge electrode 242.

Thereafter, the charged particulate matters enter the region of the collecting and sensing component 260. The collecting and sensing component 260 includes an electric field generating unit 264, a collecting unit 266, and a sensing unit 268. The electric field generating unit 264 can generate an electrostatic field (e.g., having a first electricity) that is electrically identical to the discharge electrode 242. The collecting unit 266 can include a first collecting unit 2661 and a second collecting unit 2662. In the present embodiment, the first collecting unit 2661 is a vertical collecting unit, and the second collecting unit 2662 is a horizontal collecting unit. However, the present invention is not limited thereto, and the first collecting unit 2661 and the second collecting unit 2662 may have any arrangement (for example, having different inclination angles) as long as it can correspond to the electric field generation unit 264. The second collecting unit 2662 is, for example, a plate-like structure including a collecting plate 2662a. In an embodiment, the diameter $d_4$ of the acceleration channel 262 may be between 0.5 and 2 mm, and the distance $h_4$ between the acceleration channel 262 and the second collecting unit 2662 may be between 0.5 and 2 mm. The diameter $d_4$ of the acceleration channel 262 is smaller than the width of the collecting plate 2662a. The second collecting unit 2662 is located below the electric field generating unit 264. An electrostatic field is generated by the electric field generating unit 264 (for example, having a first electricity), and a portion of the particulate matters having the first electricity is repelled due to the same electricity as the discharge electrode 242, so that the particulate matters having the first electricity are close to the first collecting unit 2661. The remaining portion of the particulate matters having the first electricity are collected by the inertial impact on the second collecting unit 2662. A nozzle structure may also be disposed above the second collecting unit 2662 to increase the collection efficiency of the second collecting unit 2662. In an embodiment, the nozzle structure is a conductive material, such as a metal material, for use as a collecting unit. The majority of the particle diameter of the particulate matters collected on collecting unit 266 can range from 0.25 micro meters to 2.5 micro meters. The collecting unit 266 collects the particulate matters having the first electricity. The particulate matters that the electricity thereof have been collected and other particulate matters that have not been collected by the collecting unit 266 are discharged from the particulate matter sensing device 200 via the air extracting unit 274 along with the air flow. In an embodiment, the collecting unit 266 is an electrically conductive material, such as a metal material. The sensing unit 268 can include an ammeter, an electrometer, a voltmeter, or a circuit. The ammeter or electrometer can be electrically connected to the collecting unit 266 by the current sensing probe to detect the current flowing to the particulate matters on the collecting unit 266. The voltmeter can be electrically connected to the collecting unit 266 by the voltage sensing probe to detect the voltage of the particulate matters reaching the collecting unit 266. The first collecting unit 2661 and the second collecting unit 2662 are electrically connected to a sensing unit 268 (for example, an ammeter, an electrometer or a voltmeter) or a circuit board. In one embodiment, the collecting unit 266 and the nozzle structure 2663 are electrically connected to a sensing unit 268 or a circuit board using a current or voltage sensing probe 268e. In some embodiments, the sensing unit 268 in the collecting and sensing component 260 can be electrically connected to a data analysis circuit 270 for data processing.

Since the collecting and sensing component 260 of the present invention includes the electric field generating unit 264 and the collecting unit 266, the charged particles are collected on the collecting unit 266 by the inertial impact and the electrostatic field, so that compared with the general optical type of the particle sensing device in the comparative example, the particle collection efficiency can be increased, and the lower limit of the detected particle diameter can be reduced, thereby improving the accuracy of the sensing of particulate matters.

In the present embodiment, the particulate matter sensing devices 100 and 200 may have a strong outer casing (for example, a metal material) to cover components such as a screening component, a charging component, a sensing component, an air-extracting unit, and the like, and thus the internal structure is not directly exposed to the environment and will extend its service life. In addition, in the present embodiment, the shape of the particulate matter sensing devices 100 and 200 are cylindrical, but the invention is not limited thereto, and the particulate matter sensing devices 100 and 200 may also be rectangular parallelepipeds or other suitable structures.

The particulate matter sensing devices 100 and 200 of the present invention can have a smaller size than the conventional large particulate matter sensing device, so that they are easy to carry, have lower cost, and can be universally provided for people to use. In addition, the particulate matter sensing devices 100 and 200 of the present invention can be integrated with an indoor air cleaner, an air conditioning system, a factory air pollution prevention device system, and can be separately applied to outdoor particulate matter sensing (for example, in the factory area, smoke outlets, communities, streets), and have a variety of application methods.

Figure 3:
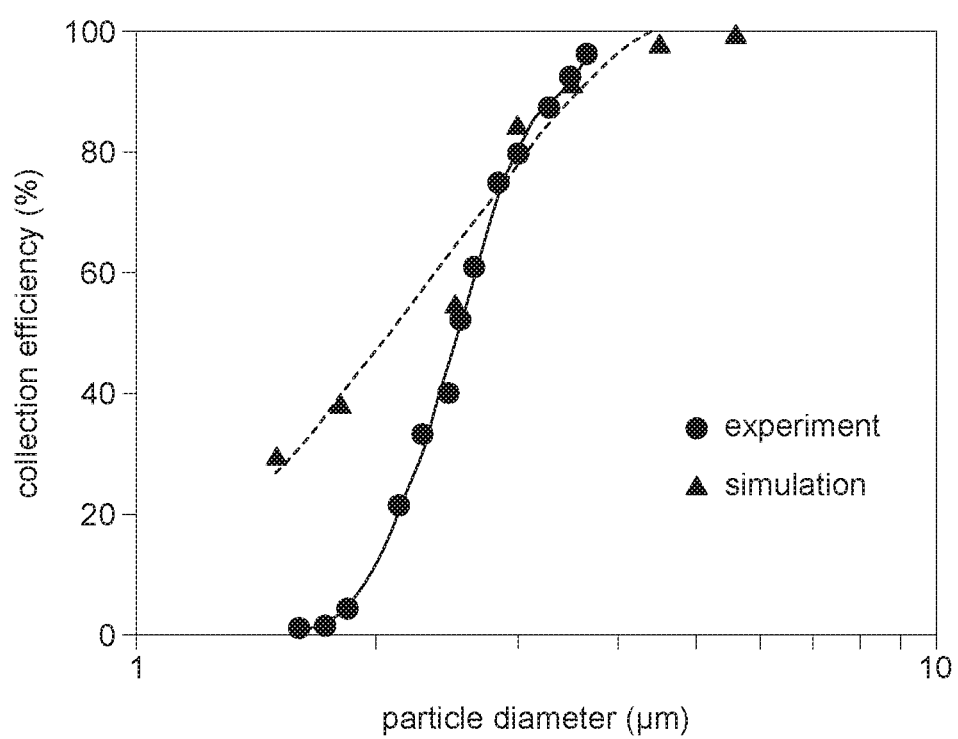
FIG. 3 is a graph showing the relationship between the collection efficiency and the particle diameter of the particulate matter sensing device according to an embodiment of the present invention.

FIG. 3 is a graph showing the relationship between the collection efficiency of the screening component and the particle diameter of the particulate matter sensing device according to an embodiment of the invention.

Referring to FIG. 3, it shows an experiment value and a simulation value for screening the particle diameter of particulates using a particulate matter sensing device (for example, a particulate matter sensing device 200) according to an embodiment of the present invention. In the art, the cut-size of aerodynamic diameter ($Da_{50}$) is defined as the particle aerodynamic equivalent diameter corresponding to the particle collection efficiency of the screening component of 50%. In the present embodiment, the cut-size of aerodynamic diameter of the particulate matter sensing device 200 is expected to be 2.5 micro meters. As shown in FIG. 3, the measured particle diameter after screening by the screening component 220 is 2.5±0.04 μm, which is quite close to the expected cut-size of aerodynamic diameter (2.5 μm), which meets the requirements of $PM_{2.5}$ screening.

Figure 4:
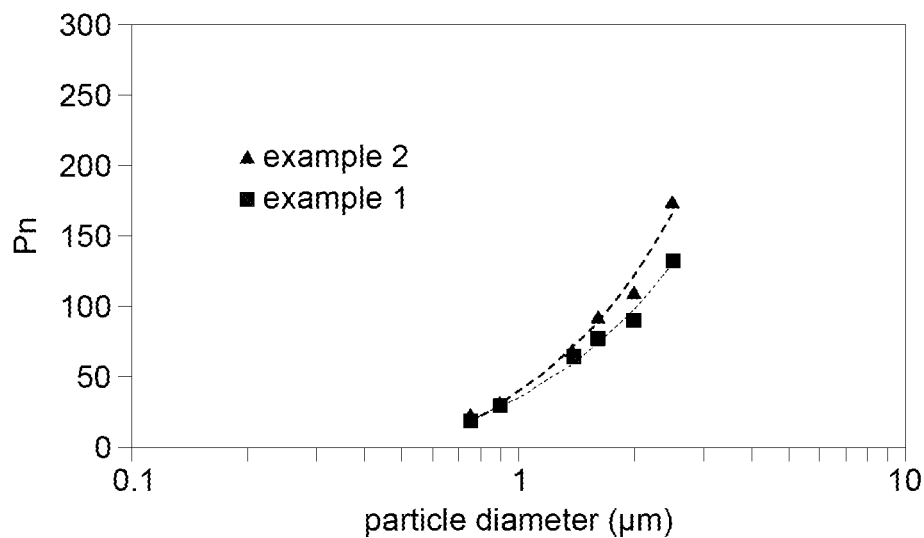
FIG. 4 is a graph showing the relationship between the charging efficiency and the particle diameter of the particulate matter sensing device according to an embodiment of the present invention.

FIG. 4 is a graph showing the relationship between the charging efficiency and the particle diameter of the particulate matter sensing device according to an embodiment of the present invention.

Please refer to FIG. 4, which shows a relationship between charging efficiency and particle diameter of example 2 and example 1, in which the X-axis coordinate indicates the particle diameter, and the Y-axis indicates the charging efficiency (Pn) of the particulate matters. Example 1 shows the results of tests conducted by the particulate matter sensing device 100 of the present invention, and example 2 shows the results of tests conducted by the particulate matter sensing device 200 of the present invention. As shown in FIG. 4, the charging efficiencies of the particulate matters of example 1 and example 2 are all capable of efficiently charging the particulate matter having a particle diameter of 2.5 μm or less. Among them, the charging efficiency of example 2 was increased by about 4% to 31% compared with the charging efficiency of example 1.

Figure 5:
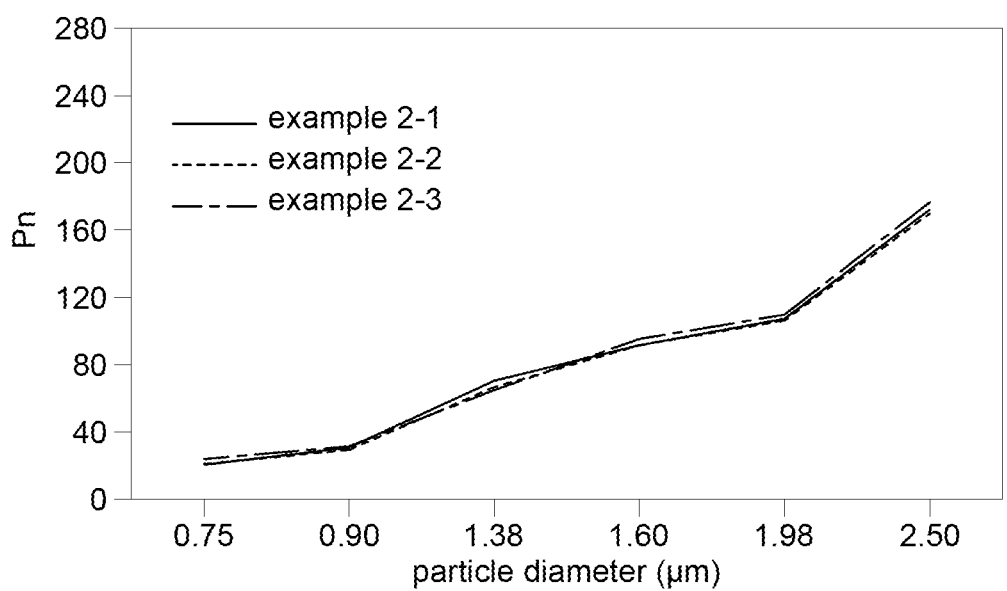
FIG. 5 is a graph showing the relationship between the charging efficiency and the particle diameter of the particulate matter sensing device according to an embodiment of the present invention.

FIG. 5 is a graph showing the relationship between the charging efficiency and the particle size of the particle sensing device according to an embodiment of the invention.

Please refer to FIG. 5, it shows test results of charging efficiency of the example 2 (the particulate matter sensing device 200 of the present invention) that is continuously performed multiple times (for example, example 2-1, example 2-2 and example 2-3) in the range of the particle diameter of 0.75 to 2.50 μm, in which the X-axis coordinate indicates the particle diameter, and the Y-axis indicates the charging efficiency of the particulate matter. As shown in FIG. 5, there is a similar trend between the results of multiple experiments using the particulate matter sensing device 200 of the present invention. The coefficient of variation (CV) between example 2-1, example 2-2 and example 2-3 is less than 5%. In fact, in example 2, the coefficient of variation of the charging efficiency tested for 10 consecutive times was about 4.1%. For the sake of simplicity, FIG. 5 only shows the results of the experiment for three times. It can be seen that the experimental results measured using the particulate matter sensing device 200 of the present invention have excellent reproducibility, that is, have high stability.

Figure 6:
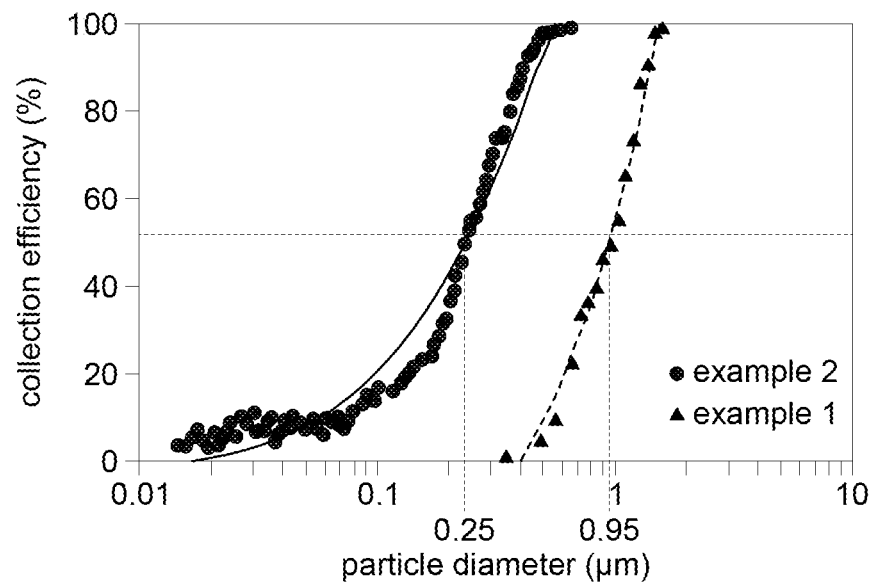
FIG. 6 is a graph showing the relationship between the collection efficiency and the particle diameter of the particulate matter sensing device according to some embodiments of the present invention.

FIG. 6 is a graph showing the relationship between particle collection efficiency and particle diameter of a particulate matter sensing device in accordance with some embodiments of the present invention.

Referring to FIG. 6, it shows the results of collection efficiency of example 1 (particulate matter sensing device 100 of the present invention) and example 2 (particulate matter sensing device 200 of the present invention), wherein the X axis indicates particle diameter (μm) and the Y axis indicate the particle collection efficiency (%). As shown in FIG. 6, the lower limit of the cut-size of aerodynamic diameter detected in example 1 was 0.95 μm, and the lower limit of the cut-size of aerodynamic diameter detected in example 2 was 0.25 μm. As can be seen in either example 1 or example 2, the lower limit of detection thereof is better than the lower limit of detection (>1.0 μm) of the current simple optical particulate matter sensing device. It can be seen that the particulate matter sensing device of the present invention has a lower detection limit of the particle diameter of the particulate matters compared to the general simple optical particulate matter sensing device, and has higher sensing accuracy.

Figure 7:
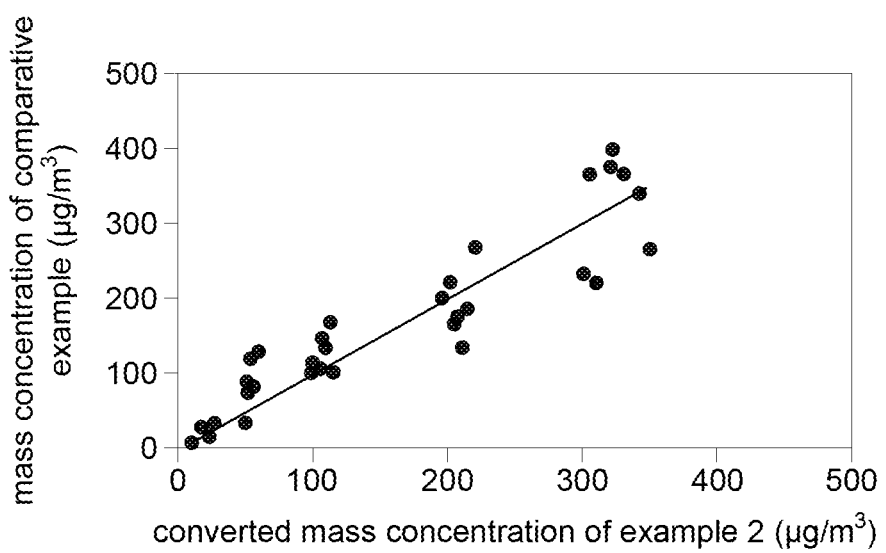
FIG. 7 is a graph showing the relationship between the mass concentration of the comparative example of the particulate matter sensing device and the mass concentration after the conversion of example 2 according to an embodiment of the present invention.

FIG. 7 is a graph showing the relationship between the mass concentration of a comparative example and the converted mass concentration of example 2 according to a particulate matter sensing device of an embodiment of the present invention.

Please refer to FIG. 7, it shows a comparative result between a mass concentration of the example 2 (the particulate matter sensing device 200 of the present invention) which is converted by the current value measured by an electrometer at different concentrations and a mass concentration of a reference instrument (DUSTTRAK DRX, model 8533, TSI) of a comparative example. The results show that the linear correlation coefficient $R^2$ between the example 2 and the comparative example is 0.898. It can be seen that there is an excellent agreement between the concentration of $PM_{2.5}$ measured by the particulate matter sensing device 200 according to an embodiment of the present invention and the concentration of $PM_{2.5}$ measured by the reference instrument of the comparative example.

The present invention provides a particulate matter sensing device. Since the particulate matter sensing device of the present invention collects particulate matters under the action of an electrostatic field and impact, and measures the concentration of the particulate matters by charging the particulate matters, the factors which influence the sensing of the optical particulate matter sensing device can be avoided. Further, in comparison with the optical particulate matter sensing device, the particulate matter sensing device of the present invention has a lower measurement limit of the particle diameter and has better precision of sensing of particulate matters.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A particulate matter sensing device comprising:
a screening component for separating a plurality of particulate matters by inertial impact;
a charging component for generating a plurality of ions to be combined with the particulate matters selected by the screening component, making those particulate matters possess a first electricity; and
a collecting and sensing component further comprising a collecting unit and a sensing unit, wherein the sensing unit is electrically connected to the collecting unit to detect an amount of charge carried by the particulate matters reaching the collecting unit,
wherein the screening component includes an impaction panel and an adjustment element, and a distance between the impaction panel and an inlet can be changed by the adjustment element, and
wherein the impaction panel has no holes and separates the particulate matters by inertial impact.

2. The particulate matter sensing device according to claim 1, wherein the charging component includes a discharge electrode for generating the ions, and an ion captor for capturing free ions that are not combined to the particulate matters among the ions generated by the discharge electrode.

3. The particulate matter sensing device according to claim 2, wherein the ion captor has a second electricity, and the second electricity is opposite to the first electricity.

4. The particulate matter sensing device according to claim 1, wherein the sensing unit is an ammeter, the ammeter is electrically connected to the collecting unit, and detects the current carried by the particulate matters reaching on the collecting unit.

5. The particulate matter sensing device of claim 1, wherein the collecting and sensing component comprises an acceleration channel and an electric field generating unit, the electric field generating unit has the first electricity, the particulate matters having the first electricity are inertially impacted on the collecting unit by the acceleration channel, and the electric field generating unit approaches the particulate matters with the first electricity toward the collecting unit.

6. The particulate matter sensing device of claim 1, wherein the collecting unit is a conductive material.

7. The particulate matter sensing device of claim 1, wherein the collecting and sensing component comprises an electric field generating unit, and the collecting unit comprises a first collecting unit and a second collecting unit, the first collecting unit surrounds the electric field generating unit, the second collecting unit is located below the electric field generating unit, and a part of the particulate matters with the first electricity are moved to the first collecting unit by the electric field generating unit, the remaining of the particulate matters with the first electricity are inertially impacted on the second collecting unit.

8. The particulate matter sensing device of claim 1, wherein a majority of particle diameter of the particulate matters collected on the collecting unit is between 0.25 micrometers and 2.5 micrometers.

9. The particulate matter sensing device of claim 1, further comprising an air extracting unit for guiding airflow in the particulate matter sensing device to an outside.

10. The particulate matter sensing device of claim 1, further comprising a data analysis circuit electrically connected to the collecting and sensing component for data processing.

11. A particulate matter sensing device comprising:
a screening component for separating a plurality of particulate matters by inertial impact;
a charging component for generating a plurality of ions to be combined with the particulate matters selected by the screening component, so that the particulate matters selected by the screening component respectively have a first electricity; and
a collecting and sensing component including a collecting unit and a sensing unit, wherein the sensing unit is electrically connected to the collecting unit to detect an amount of charge carried by the particulate matters reaching the collecting unit, wherein the collecting unit further comprising a horizontal collecting unit,
wherein the screening component includes an impaction panel and an adjustment element, and a distance between the impaction panel and an inlet can be changed by the adjustment element, and
wherein the impaction panel has no holes and separates the particulate matters by inertial impact.

12. The particulate matter sensing device according to claim 11, wherein the collecting and sensing component comprises an acceleration channel and an electric field generating unit, the particulate matters having the first electricity are inertially impacted on the collecting unit by the acceleration channel, and the electric field generating unit approaches the particulate matters with the first electricity toward the collecting unit.

13. The particulate matter sensing device of claim 12, wherein the collecting unit is a conductive material.

14. A particulate matter sensing device comprising:
a screening component for separating a plurality of particulate matters by inertial impaction;
a charging component for generating a plurality of ions to be combined with the particulate matters selected by the screening component, so that the particulate matters selected by the screening component respectively have a first electricity; and
a collecting and sensing component including a collecting unit and a sensing unit, wherein the sensing unit is electrically connected to the collecting unit to detect an amount of charge carried by the particulate matters reaching the collecting unit, wherein the collecting unit further comprising a horizontal collecting unit and a vertical collecting unit,
wherein the screening component includes an impaction panel and an adjustment element, and a distance between the impaction panel and an inlet can be changed by the adjustment element, and
wherein the impaction panel has no holes and separates the particulate matters by inertial impact.

15. The particulate matter sensing device according to claim 14, wherein the charging component includes a discharge electrode for generating the ions, and an ion captor for capturing free ions that are not combined to the particulate matters among the ions generated by the discharge electrode, wherein the ion captor surrounds the discharge electrode.

16. The particulate matter sensing device of claim 14, wherein the collecting and sensing component comprises an electric field generating unit, the charging component comprises a discharge electrode, wherein an electricity applied to the electric field generating unit is the same as an electricity of the discharge electrode, the vertical collecting unit surrounds the electric field generating unit, the horizontal collecting unit is located below the electric field generating unit, and a part of the particulate matters with the first electricity are moved to the vertical collecting unit by the electric field generating unit, the remaining of the particulate matters with the first electricity are inertially impacted on the horizontal collecting unit.

17. The particulate matter sensing device of claim 14, wherein the vertical collecting unit and the horizontal collecting unit are electrically connected to a sensing unit together.

18. The particulate matter sensing device of claim 1, wherein the collecting unit further comprises a collecting plate.

19. The particulate matter sensing device of claim 1, wherein the screening component is adjustable to the distance between the impaction panel and the inlet according to a predetermined size of the particulate matters to be collected and an amount of gas flow.

20. The particulate matter sensing device of claim 16, wherein the horizontal collecting unit further comprises a nozzle structure, and is electrically connected to a sensing unit or a circuit board with the collecting unit.

21. The particulate matter sensing device of claim 19, wherein the inlet has a diameter smaller than a width of the impaction panel.

22. The particulate matter sensing device of claim 18, wherein the collecting and sensing component comprises an acceleration channel having a diameter smaller than a width of the collecting plate.

* * * * *